United States Patent
Iwashita et al.

(10) Patent No.: US 6,809,493 B2
(45) Date of Patent: Oct. 26, 2004

(54) SERVO CONTROLLER

(75) Inventors: Yasusuke Iwashita, Yamanshi (JP); Kazuomi Maeda, Kumamoto (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/305,116

(22) Filed: Nov. 27, 2002

(65) Prior Publication Data
US 2003/0111973 A1 Jun. 19, 2003

(30) Foreign Application Priority Data

Dec. 19, 2001 (JP) .......................................... 2001-385861

(51) Int. Cl.[7] .............................................. G05B 11/32
(52) U.S. Cl. .................................................... 318/625
(58) Field of Search ................................ 318/609, 610, 318/625, 34, 560, 53, 59, 66, 71

(56) References Cited

U.S. PATENT DOCUMENTS

| | | | |
|---|---|---|---|
| 5,086,263 A | 2/1992 | Kubota et al. | |
| 5,319,288 A | 6/1994 | Kono et al. | |
| 6,252,367 B1 * | 6/2001 | Sakamoto et al. | 318/560 |
| 6,534,944 B2 | 3/2003 | Toyozawa et al. | |

FOREIGN PATENT DOCUMENTS

| | | |
|---|---|---|
| DE | 44 32 143 | 3/1996 |
| EP | 0 952 504 | 10/1999 |
| EP | 0 982 980 | 3/2000 |
| EP | 1 143 315 | 10/2001 |
| JP | 58-120450 | 7/1983 |
| JP | 2000-270595 | * 9/2000 |
| JP | 2001-273037 | * 5/2001 |

OTHER PUBLICATIONS

Notice of Grounds for Rejection for application No. 2001-385861 dated Aug. 26, 2003.

* cited by examiner

Primary Examiner—Jeffrey W Donels
(74) Attorney, Agent, or Firm—Staas & Halsey LLP

(57) ABSTRACT

A servo controller carries out tandem control in which one driven body is driven by a plurality of motors. Each motor is provided with a position control section, a velocity control section, a current control section, a current amplifier, and a velocity detector. This tandem control is carried out by using a velocity integrator sharing unit for equalizing integral values of integration elements of the velocity control sections. The same position command is inputted to control systems for the plurality of motors to undergo tandem control. The velocity integrator sharing unit keeps the integral values of the integration elements of the velocity control sections substantially equal.

13 Claims, 10 Drawing Sheets

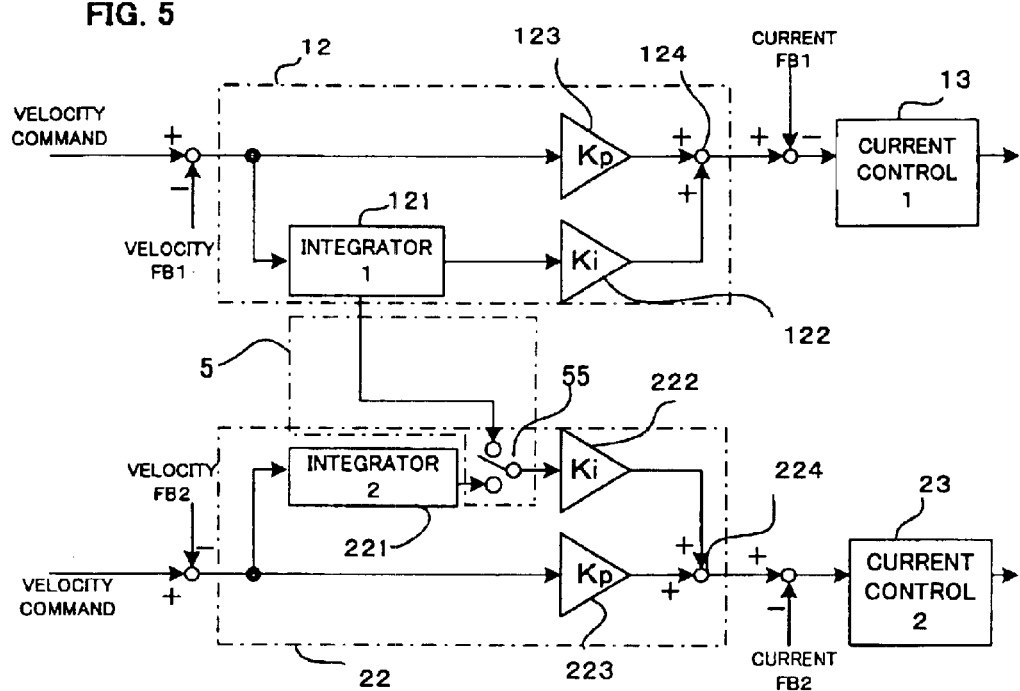
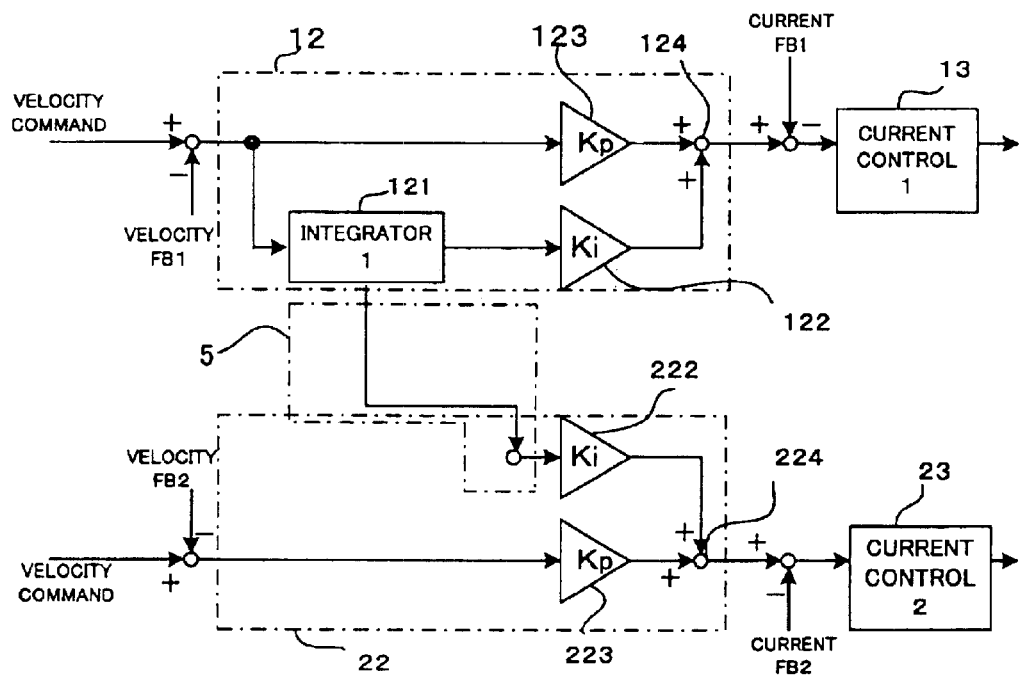

SERVO CONTROLLER

BACKGROUND OF THE INVENTION

1. Field of the Invention

The present invention relates to a servo controller that controls driving of an arm of a robot or a feed shaft of a drive mechanism such as a machine tool, injection molding equipment, or a pressing machine, and in particular, to tandem control in which one movable member is controlled by a plurality of motors.

2. Description of the Related Art

Tandem control is known as a drive method used for drive mechanisms for various machines such as robots, machine tools, injection molding equipment, and pressing machines. With this method, if a movable member to be moved is too large to accelerate or decelerate by one motor that drives a movement shaft of the movable member, the same movement command is provided to a plurality of motors, which then drive this movable member. Thus, the movable member is stably driven while maintaining a proper position. With this method, a drive shaft of each motor must have its position controlled so that the movable member will not be twisted.

FIG. 13 is a block diagram showing an example of configuration of conventional position tandem control. This drawing shows an example of tandem control for a drive mechanism in which two motors, a first motor 15 and a second motor 25, drive one movable member 4.

A controller for the first motor 15 comprises a position control section 11 that carries out position loop control, a velocity control section 12 that carries out velocity loop control, a current control section 13, and a current amplifier 14. Furthermore, the first motor 15 is provided with a velocity detector 17 that detects a velocity feedback amount (velocity FB1). A movable member 4 located closer to the first motor is provided with a position detector 18 that detects a position feedback amount (position FB1).

Further, a controller for the second motor 25 comprises a position control section 21, a velocity control section 22, a current control section 23, and a current amplifier 24. Furthermore, the second motor 25 is provided with a velocity detector 27 that detects a velocity feedback amount (velocity FB2). A movable member 4 located closer to the second motor is provided with a position detector 28 that detects a position feedback amount (position FB2).

Depending on the conditions of the movable member 4 such as its rigidity, only one or neither of the position detectors 18 and 28 are attached to the movable member 4. In the former case, the other position detector is installed on an output shaft of the motor. Further, only one of the position detectors 18 and 28 may be provided. That is, the plurality of motors used for tandem control may be provided with the respective position detectors or one common position detector. Furthermore, the position detector 18 or 28 may be attached to the output shaft of the motor or the like to detect the rotating position of the motor and thus the position of the movable member. Alternatively, the position detector may be attached directly to the movable member to directly detect its movement. Further, the position detector may be composed of a linear scale or a rotary encoder.

The position control sections 11 and 21 each receive, from a higher controller (not shown), the same position command distributed by a command distributor 3, and subtract the position feedback amount (position FB1 or position FB2, respectively; if only one position detector is provided, then position FB1=position FB2) from the command to obtain a position deviation. The position control section then processes the position deviation amount obtained to output a velocity command.

The velocity control sections 12 and 22 each receive the velocity command from the position control section 11 or 21, respectively, and subtract, from the velocity command, the velocity feedback amount (velocity FB1 or velocity FB2, respectively) detected by the velocity detector 17 or 27 attached to the motor, respectively, to obtain a velocity deviation amount. On the basis of the velocity deviation amount obtained, the velocity control section executes a velocity loop process including a proportion and integration to output a current command.

The current control sections 13 and 23 each receive the current command from the velocity control section 12 or 22, respectively, and subtract, from the current command, a current feedback amount from a sensor (not shown) that detects a motor current. The current control section then processes the current deviation amount obtained (current FB1 or current FB2) to output a voltage command.

The current amplifiers 14 and 24 each receive the voltage command from the current control section 13 or 23, respectively, and form a drive current to drive the motor 15 or 25, respectively, thereby driving the motor 15 or 25. Then, the motors 15 and 25 drive ball screws 16 and 26, respectively, screwed in ball nuts attached to the movable member 4, thus moving the movable member 4.

In this manner, on the basis of the same position command, loop processes for position, velocity, and current are executed for the two motors 15 and 25, so that the movable member 4 is driven by the resultant force of output torque from the two motors.

With the position tandem control described above, repeated accelerations and decelerations cause integral values of integrators of the velocity control sections 12 and 22 to increase on the plus and minus sides, respectively, owing to a difference in loading timing between the velocity feedback amounts (velocity FB1 and velocity FB2) as well as quantization. Thus, an excessive current command may be generated. In particular, if only one position detector is provided and common position feedback is provided to all motors (position FB1=position FB2), when there is only a small difference between a motor drive position and a position detected by the position detector (when the position detector is attached to a rotating shaft of the motor or to a position close to a drive mechanism for the motor), the integrator in the velocity control section of the control system for the motor generates a current command based on its own integral value. As a result, position feedback is provided so as to eliminate this bias.

However, for the other motor, whether the integral value of the integrator in the velocity control section of the control system for the motor increases on the plus or minus side, position feedback is not provided in a manner such that it eliminates this bias. Accordingly, the integrator continues having such a biased integral value, thereby degrading controllability of the motor. Consequently, the motor may be overheated.

For example, in the example in FIG. 13, if there is no or only a small difference between the rotating position of the first motor 15 and the position detected by the position detector, it will be impossible for the integral value of the integrator in the velocity control section 12 of the control system for the first motor 15 to significantly increase.

However, for the second motor 25, position feedback (position FB2) is not provided in a manner such that it eliminates the bias in the integral value of the integrator in the velocity control section 22, with the result that the integral value of the integrators becomes biased, thereby degrading controllability of the motor. Consequently, the second motor 25 may be overheated.

SUMMARY OF THE INVENTION

It is an object of the present invention to solve the above described problems of the prior art to correct a bias in an integral value of an integration element of a velocity control section, thus preventing degradation of controllability of a motor and occurrence of overheat of the motor which may be caused by this bias.

For the purpose of attaining this object, according to a first aspect of the present invention, there is provided a servo controller that allows one driven body to be driven by a plurality of motors. This servo controller comprises, for each of the motors, a position control section and a velocity control section. The position control section calculates a position deviation value as a difference between a position command value inputted by a higher controller and a feedback value provided by a position detector that detects a position of the driven body, and then outputs a velocity command. The velocity control section receives the velocity command value and obtains, using an integration element and a proportion element, a current command based on the velocity command value and a velocity feedback value provided by a velocity detector that detects a velocity of the driven body, and then outputs the current command. Each of the position control sections receive the same position command from the higher controller to control the driven body. The servo controller further comprises means for equalizing outputs from the integration elements in the velocity control sections.

The servo controller may assume the following forms:

Means for equalizing the outputs from the integration elements uses an output from the integration element of one of the plurality of velocity control sections as an output from the integration element of the other velocity control section.

The means for equalizing the outputs from the integration elements replace an integral value of the integration element in one of the plurality of velocity control sections with an integral value of the integration element in the other velocity control section by rewriting.

The means for equalizing the outputs from the integration elements determines an average value for the velocity feedback amounts inputted by the plurality of velocity control sections and uses this average value as a velocity feedback amount for the integration element in each of the plurality of velocity control sections.

The means for equalizing the outputs from the integration elements obtains the same value by using a time constant circuit to cause a delay for a fixed time.

The means for equalizing the outputs from the integration elements is enabled while the driven body is stopped.

The means for equalizing the outputs from the integration elements performs one rewrite operation whenever the driven body is stopped.

The means for equalizing the outputs from the integration elements performs a rewrite operation whenever and while the driven body is stopped.

The means for equalizing the outputs from the integration elements is enabled when an external signal is inputted.

The means for equalizing the outputs from the integration elements is enabled when the integration elements provide the same value after the external signal has been inputted.

Further, according to a second aspect of the present invention, there is provided a servo controller that allows one driven body to be driven by a plurality of motors. This servo controller comprises position control sections that carry out position loop control for each of the motors, and velocity control sections that carry out velocity loop control including a proportion and integration processes. Each of the position control sections receives the same position command from a higher controller, and carries out position loop control to output a velocity command. Furthermore, an integration element is provided in only the velocity control section for a particular one of the plurality of motors, and each of the velocity control sections for other motors carries out an integration process using an output from the integration element of the velocity control section for the particular motor. Further, the velocity control section carries out a proportion process on the basis of its own velocity feedback value.

According to the servo controller of the present invention, tandem control is carried out so as to prevent an increase in the difference between the integral values of the integrators in the velocity control sections. This in turn prevents degradation of controllability of each motor and occurrence of overheat which may be caused by this bias.

BRIEF DESCRIPTION OF THE DRAWINGS

FIG. 5 shows a fourth example of velocity integrator sharing means in the control system of FIG. 1;

FIG. 6 shows a fifth example of velocity integrator sharing means in the control system of FIG. 1;

DETAILED DESCRIPTION OF THE PREFERRED EMBODIMENTS

Figure 1:
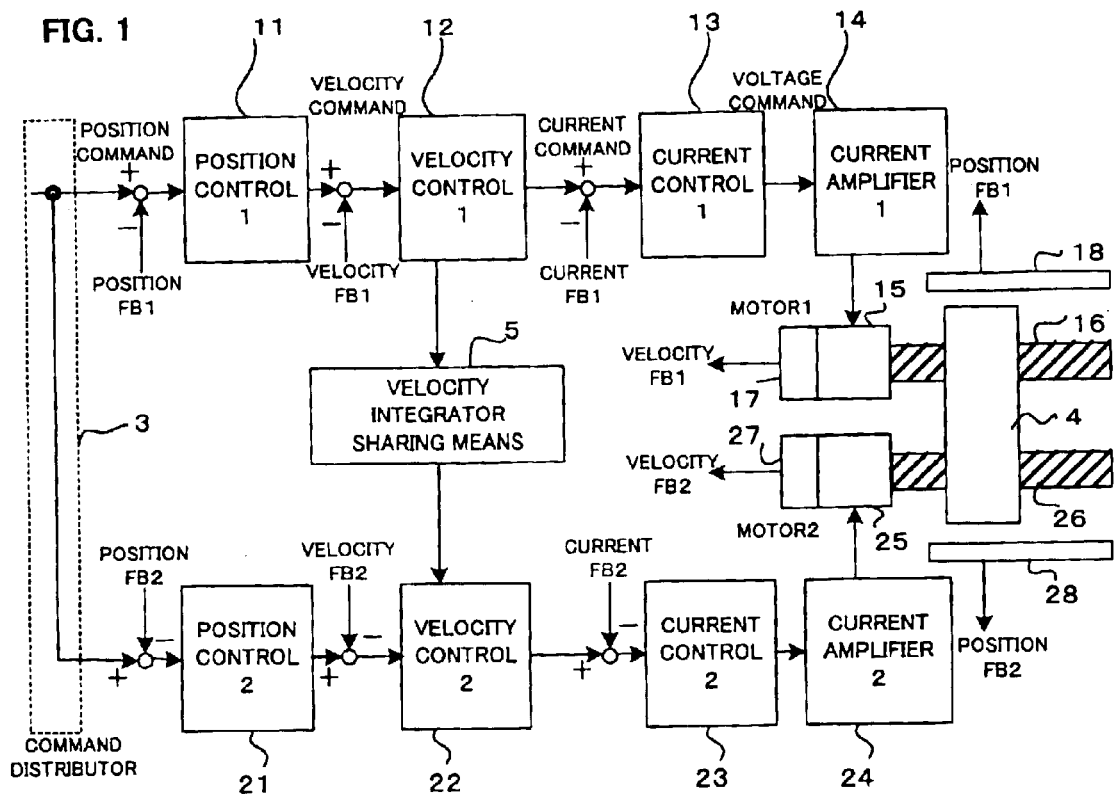
FIG. 1 is a block diagram of a control system for a motor based on tandem control according to an embodiment of the present invention.

FIG. 1 is a block diagram of a control system for a motor based on tandem control according to an embodiment of the present invention. This embodiment shows an example in which one movable member 4 is moved by two motors while having its position maintained as in the case with the conventional example shown in FIG. 13.

Figure 13:
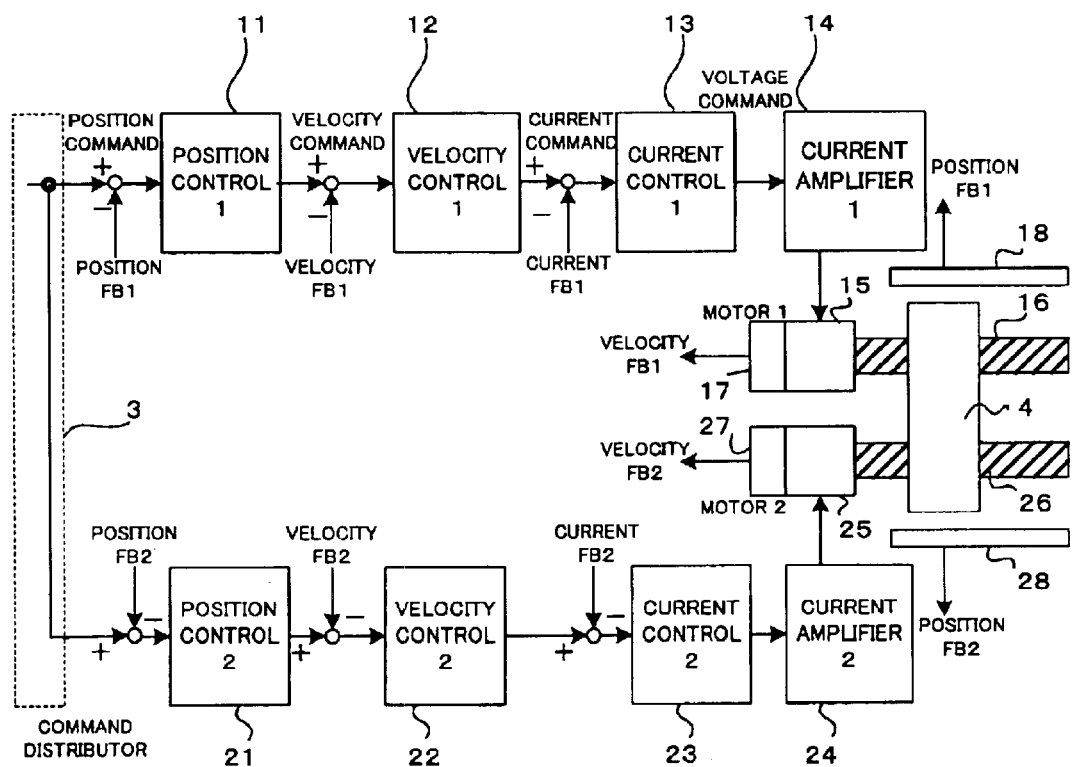
FIG. 13 is a block diagram showing an example of a configuration for conventional position tandem control.

This embodiment differs from the conventional example shown in FIG. 13 only in that it additionally has velocity integrator sharing means 5. In this embodiment, only one of the position detectors 18 and 28 may be provided. In this case, a main motor is one of the two motors which has a smaller difference between its rotating position and a position detected by the position detector, while the other is a sub-motor. The main motor and its control system are a first motor and a first motor control system.

In FIG. 1, the first control system (main control system) is composed of a position control section 11 that carries out position loop control, a velocity control section 12 that carries out velocity loop control, a current control section 13, a current amplifier 14, a motor 15, and a velocity detector 17. Further, the second control system (sub-control system) is composed of a position control section 21 that carries out position loop control, a velocity control section 22 that carries out velocity loop control, a current control section 23, a current amplifier 24, a motor 25, and a velocity detector 27. Those components in FIG. 1 which are the same as those in FIG. 13 are denoted by the same reference numerals.

Also in this embodiment, as described in the conventional example in FIG. 13, the position control sections 11 and 21 each receive, from the higher controller, the same position command distributed by the command distributor 3, and subtract the position feedback amount (position FB1 or position FB2, respectively) from the command. The position control section processes the position deviation amount obtained to output a velocity command to the velocity control section 12 or 22. The velocity control sections 12 and 22 subtract, from the velocity command, the velocity feedback amount (velocity FB1 or velocity FB2, respectively) detected by the velocity detector 17 or 27, respectively, to obtain a velocity deviation and the velocity control sections 12 and 22 execute, on the basis of the velocity deviation amount obtained, a velocity loop process including a proportion and integration to output a current command.

The current control sections 13 and 23 each receive the current command from the velocity control section 12 or 22, respectively, and subtract, from the current command, the current feedback amount (current FB1 or current FB2) outputted from the sensor (not shown) that detects a motor current. The current control section then processes the current deviation amount obtained to output a voltage command to the current amplifier 14 or 24. The current amplifiers 14 and 24 form a drive current to drive the motors 15 and 25, respectively, thereby driving the motors 15 and 25. Then, the motors 15 and 25 drive the movable member 4 via a ball screws/nut mechanism.

The above arrangements are similar to those of the conventional example, but the present invention differs from the conventional example in that it includes velocity integrator sharing means 5 that equalizes values from the integrators of the velocity control sections 12 and 22.

Figure 2:
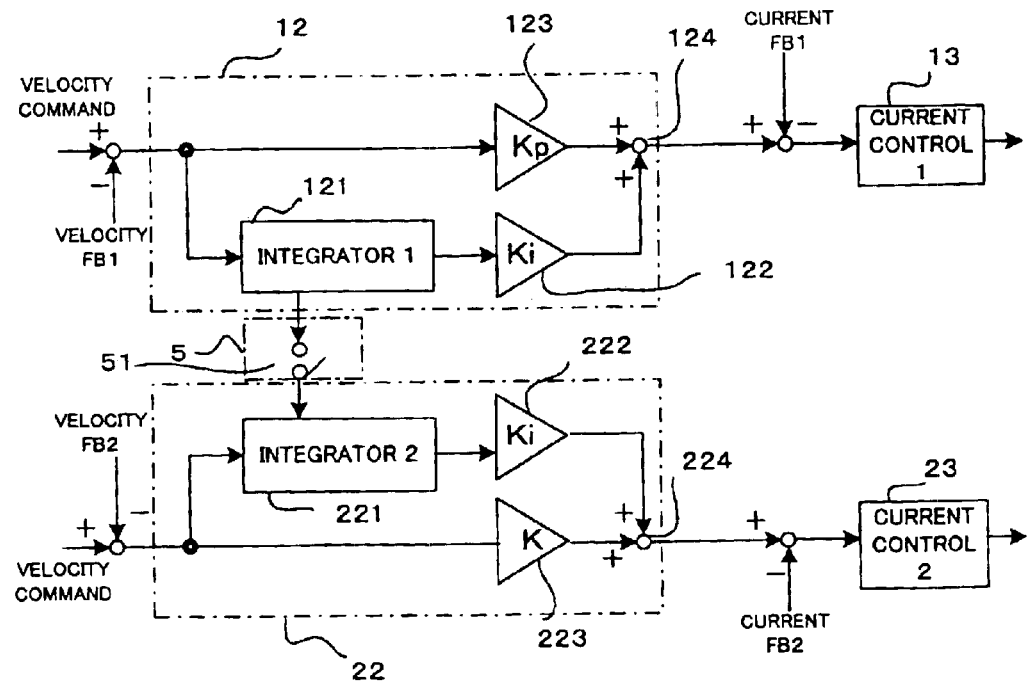
FIG. 2 shows a first example of velocity integrator sharing means in the control system of FIG. 1.

FIG. 2 is a diagram showing a first example of the velocity integrator sharing means 5. The configuration of the velocity control sections 12 and 22 is shown in connection with an example of proportion and integration (PI) control.

In FIG. 2, the velocity control section 12 of the first motor control system is composed of an integrator 121 that integrates a velocity deviation VER1 as a difference between a velocity command VCMD1 and the velocity feedback amount (velocity FB1), an amplifier 122 having an integration gain Ki which amplifies an output from the integrator 121, an amplifier 123 having a proportion gain Kp which amplifies the velocity deviation VER1, and an accelerator 124 that adds outputs from the amplifiers 122 and 123 together to output the result as an output from the velocity control section 12.

Likewise, velocity control section 22 of the second motor control system is composed of an integrator 221 that integrates a velocity deviation VER2 as a difference between a velocity command VCMD2 (if the same position detector is used, then velocity command VCMD2=VCMD1) and the velocity feedback amount (velocity FB2), an amplifier 222 having an integration gain Ki which amplifies an output from the integrator 221, an amplifier 223 having a proportion gain Kp which amplifies the velocity deviation VER2, and an accelerator 224 that adds outputs from the amplifiers 222 and 223 together to output the result as an output from the velocity control section 22.

The velocity integrator sharing means 5 shown in FIG. 2 is composed of means for switching an integral value of the integrator 221 in the velocity control section 22 of the second motor control system to an integral value of the integrator 121 in the velocity control section 12 of the first motor control system. In FIG. 2, a switch 51 constitutes this means 5. The switch 51 is automatically actuated in response to an external signal or when operation is stopped, to perform a switching operation such that the integral value of the integrator 221 is equal to the integral value of the integrator 121.

When movement commands from the higher controller (not shown) remain at a value of "0" for a specified period of time or when the position deviation becomes equal to or smaller than a threshold level with the movement commands remaining at "0" for a predetermined period of time, it is determined that an operation is being stopped and the switch 51 is actuated.

It is assumed that, as described above, the higher controller outputs the same position command to the motor control systems via the command distributor 3 to repeatedly accelerate and decelerate the first and second motors to drive the movable member 4, as a result, the integral values of the integrators 121 and 221 increase on the positive and negative sides, respectively, with the difference between the integral values increasing. Then, the switch 51 is automatically actuated in response to an external signal or when operation is stopped, so that the integral value of the integrator 221 in the second motor control system is switched to the integral value of the integrator 121 in the first motor control system.

Figure 3:
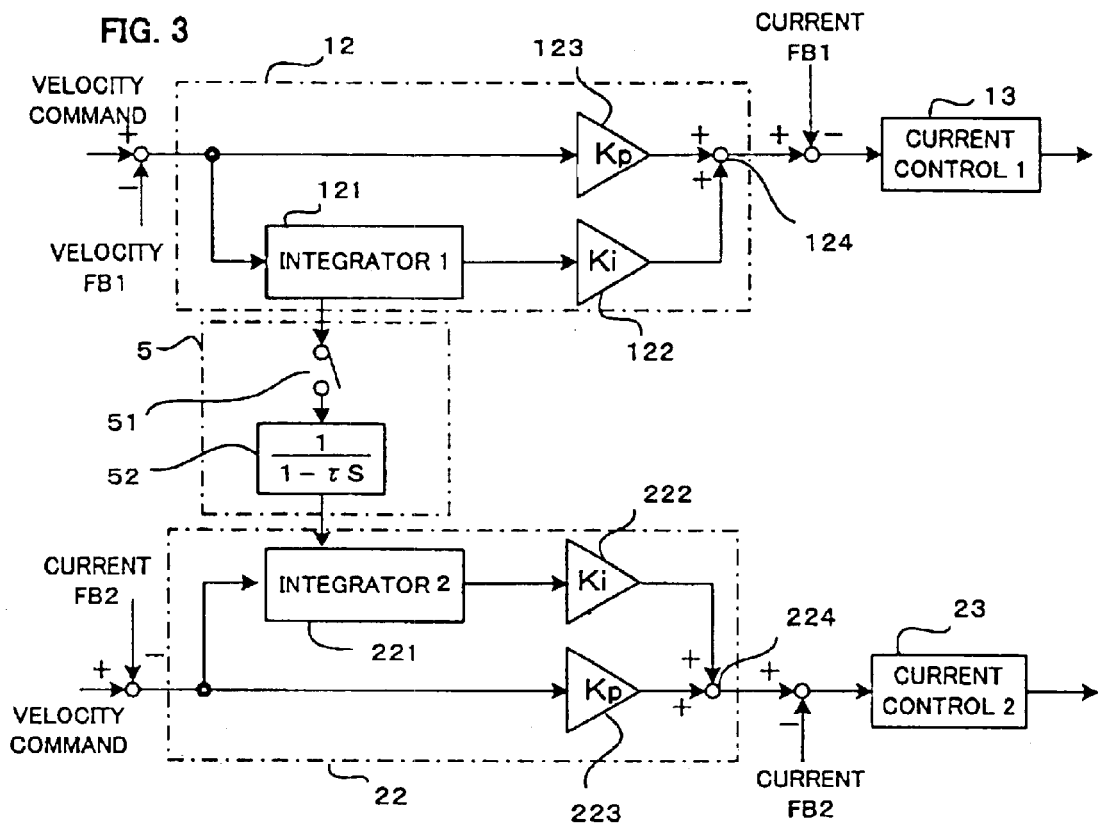
FIG. 3 shows a second example of velocity integrator sharing means in the control system of FIG. 1.

FIG. 3 shows a second example of the velocity integrator sharing means 5. In the first example shown in FIG. 2, the integral value of the integrator 221 in the second motor control system is immediately switched to the integral value of the integrator 121 in the first motor control system. However, in this case, if there is a large difference between the integral values of the two integrators 121 and 221, the integral value of the integrator 221 in the second motor control system changes suddenly, thus changing the current command (torque command) suddenly. Accordingly, in this example, the velocity integrator sharing means 5 is designed to alleviate such sudden change.

The second example, shown in FIG. 3, is the same as the first example except that a primary delay element 52 is added to the device. Thus, when the switch 51 is actuated, the integral value of the integrator 221 in the second motor control system is gradually switched to the integral value of the integrator 121 in the first motor control system according to a primary delay transfer function. The other arrangements are the same as those shown in FIG. 2.

Figure 4:
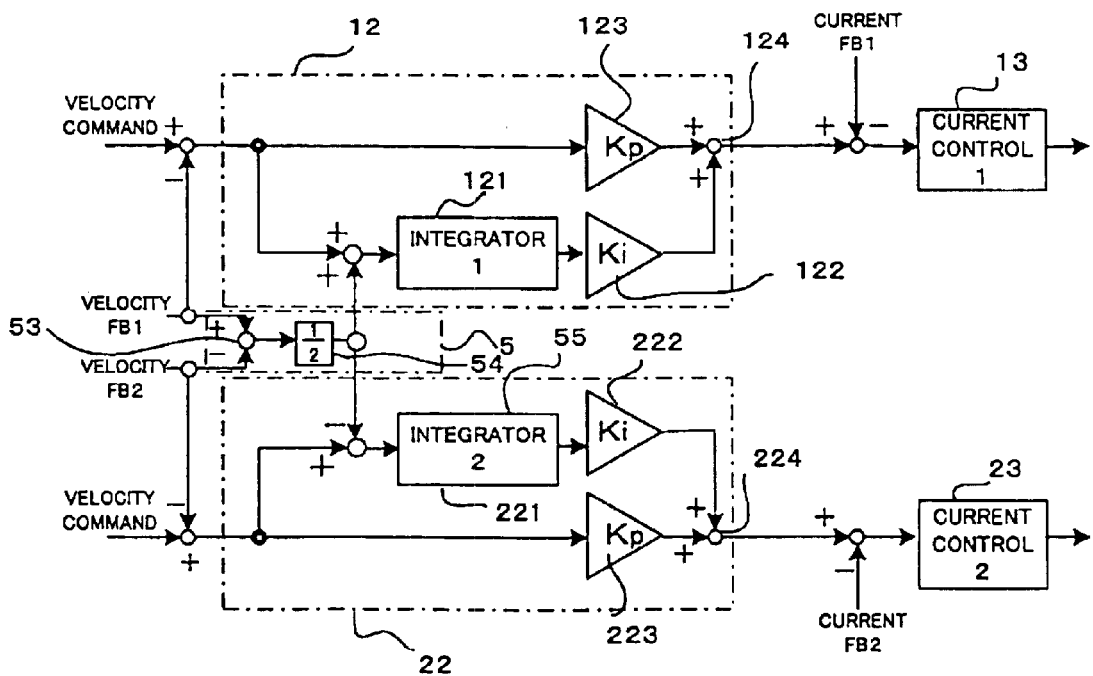
FIG. 4 shows a third example of velocity integrator sharing means in the control system of FIG. 1.

FIG. 4 shows a third example of the velocity integrator sharing means 5. In the third example, the value to be inputted to each of the integrators 121 and 221 is obtained by subtracting, from a velocity command in the corresponding motor control system, the average of velocity feedback values in this and the other motor control systems.

The third example of the velocity integrator sharing means 5 is composed of a subtractor 53 that substracts the velocity feedback amount (velocity FB2) in the second motor control system from the velocity feedback amount (velocity FB1) in the first motor control system, and a divider 54 that divides an output from the subtractor 53 by two. Thus, an output from the divider 54 is added to a velocity deviation (a difference between the velocity command and the velocity feedback amount), and the sum is inputted to the integrator 121 in the first motor control system. The output from the divider 54 is subtracted from the velocity deviation, and the difference is inputted to the integrator 221 in the second motor control system.

Let VCMD1 and VFB1 be the velocity command and the velocity feedback amount (velocity FB1) in the first motor control system, respectively, and let VCMD2 and VFB2 be the velocity command and the velocity feedback amount (velocity FB2) in the second motor control system, respectively. Then, the input to the integrator 121 in the first motor control system is expressed by:

$$VCMD1-VFB1+(VFB1-VFB2)/2=VCMD1-(VFB1+VFB2)/2 \quad (1)$$

The input to the integrator 221 in the second motor control system is expressed by:

$$VCMD2-VFB2)-(VFB1-VFB2)/2=VCMD2-(VFB1+VFB2)/2 \quad (2)$$

In this example, as shown by Equations (1) and (2), described above, the input to each integrator is obtained by subtracting the average of the velocity feedback amounts from each velocity command. In this example, as an example of the velocity integrator sharing means 5, the velocity feedback amounts VFB1 and VFB2 may be added together, and the sum may then be divided by two to obtain the average value [(VFB1+VFB2)/2]. Then, this average value may be subtracted from each of the velocity commands VCMD1 and VCMD2, and the differences may then be inputted to the integrators 121 and 221, respectively.

FIG. 5 shows a fourth example of the velocity integrator sharing means 5. In this example, the velocity integrator sharing means 5 is composed of a switch 55 that switches the input to the integration amplifier 222 in the second motor control system from an output from the integrator 221 in this system to an output of the integrator 121 in the first motor control system.

To carry out tandem control, the switch 55 is switched to the integrator 121 in the first motor control system so that this integrator 121 can be shared by the velocity control sections (12 and 22) for the motors which undergo tandem control.

It is also possible that the switch 55 is normally connected to integrator 221 and is switched to the integrator 121 in the first motor control system as required. In this case, a stable switching operation is achieved by providing an external switching command so that the switch 55 is returned to the integrator 221 when a difference in the integral values of the integrators 121 and 221 becomes equal to or smaller than a predetermined value.

Alternatively, the switch 55 may not be provided between the integrators 121 and 221, but the integrators 121 and 221 may be always connected together. FIG. 6 is a block diagram showing this case, in which only one velocity integration element (121) is provided in the first motor control system. An output from this velocity integration element is used by a different integration element 222 (in the second motor control system). Further, proportion elements in the first and second motor control systems use their own velocity feedback.

Figure 7:
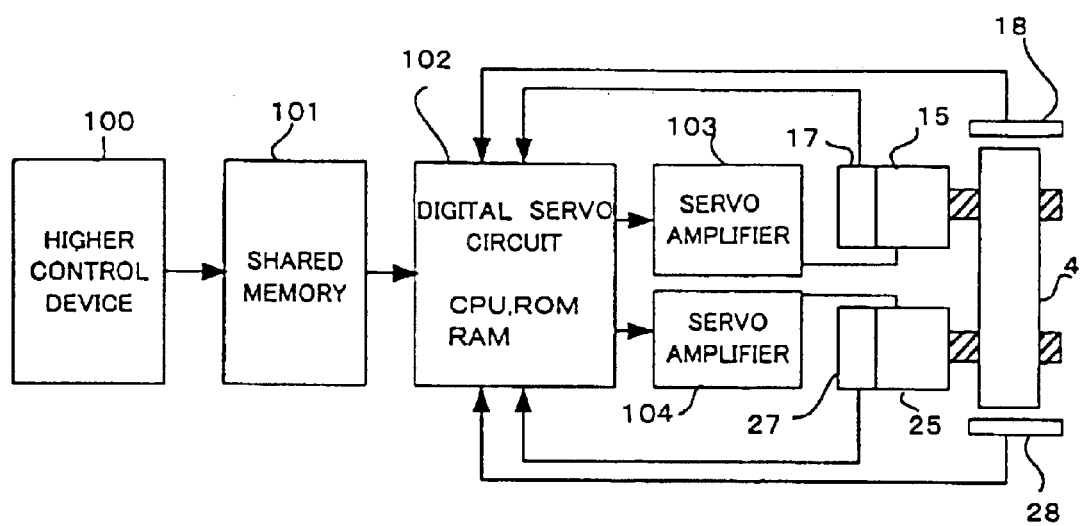
FIG. 7 is a block diagram of an essential part of a motor control system that carries out tandem control.

FIG. 7 is a block diagram of a motor control system that carries out the above described tandem control. This motor control system has the same configuration as the conventional device for servo control, and is thus schematically shown. In FIG. 7, reference numeral 100 denotes a numerical controller (CNC) as a higher controller, reference numeral 101 denotes a shared memory, and reference numeral 102 denotes a digital servo circuit having a processor (CPU), a ROM, a RAM, or the like. Reference numerals 103 and 104 denote servo amplifiers composed of transistor inverters or the like, and reference numerals 15 and 25 denote servo motors that carry out tandem control. Reference numerals 17 and 27 denote velocity detectors attached to the respective servo motors, and reference numerals 18 and 28 denote position detectors that detect the positions of the movable members (or the servo motors).

The numerical controller 100 as a higher controller outputs and writes position commands to the respective servo motors or movement commands MCMD each corresponding to a difference between position commands to the shared memory 101 for each predetermined period on the basis of an operation program or the like. To subject the motors 15 and 25 to tandem control, the position commands or movement commands MCMD provided to these motors have the same value. A processor in the digital servo circuit 102 reads this position command or the movement command MCMD and carries out the above described position, velocity, and current control for each predetermined period to drive the servo motors 15 and 25 via the servo amplifiers 103 and 104, respectively.

Figure 8:
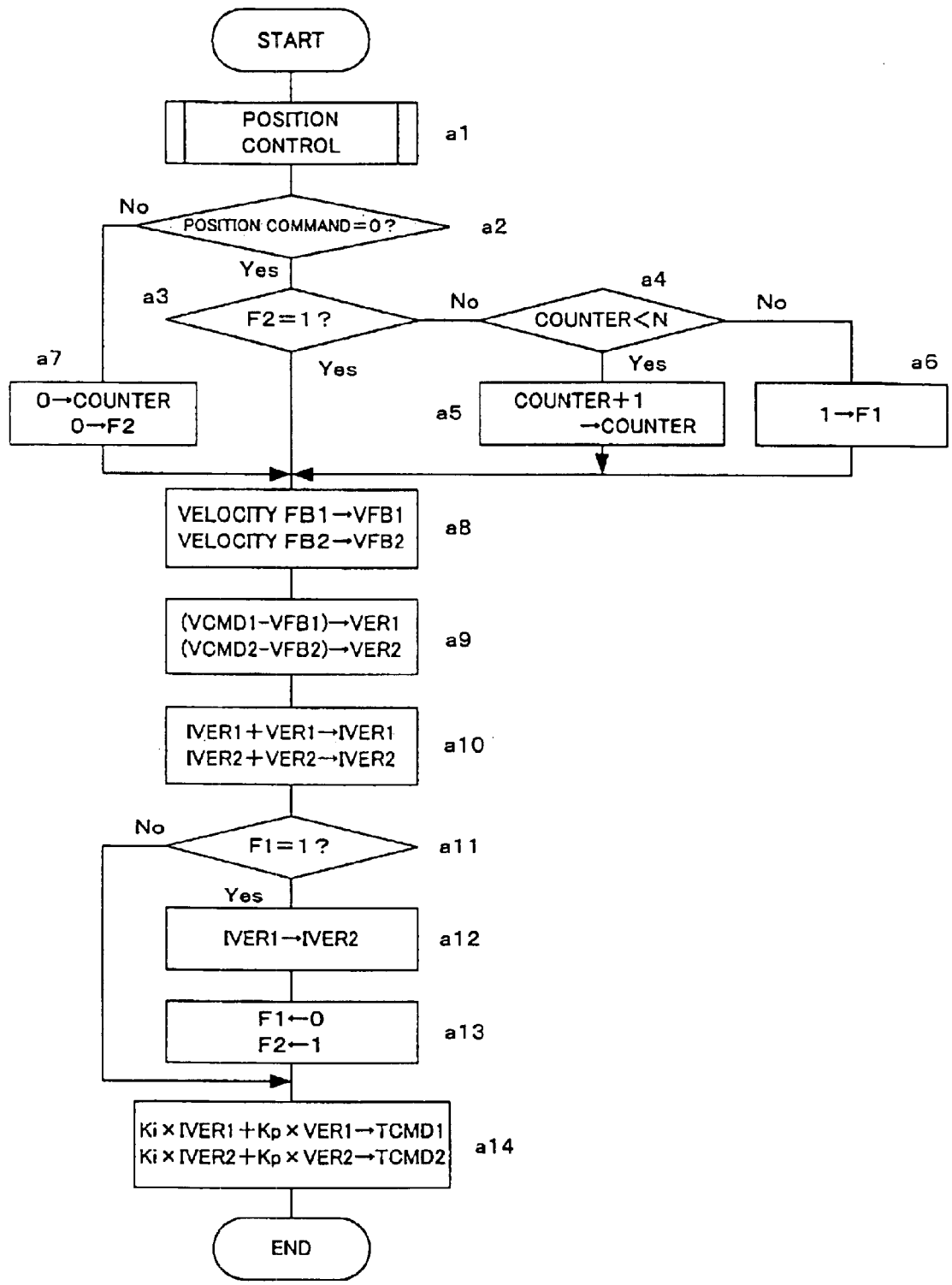
FIG. 8 is a flow chart of a process executed for each position and velocity control period by a processor of a digital servo circuit in the motor control system of FIG. 7 when the velocity integrator sharing means according to the first example is used.

FIG. 8 shows a flow chart of the operation process of the example shown in FIG. 2, executed by the processor in the digital servo circuit 102,in which the common integral value is used for tandem control. The processor executes the process shown in this flow chart, for each position and velocity process period.

First, the processor reads the movement command MCMD provided by the higher controller, reads the position feedback amounts (position FB1 and position FB2) from the position detectors 18 and 28, and executes a position loop process as in the case with the conventional example to obtain velocity commands VCMD1 and VCMD2 to the motors 15 and 25, respectively (step a1). Then, the processor determines whether or not the movement command MCMD to the motors which undergo tandem control is "0" (step a2). If it is not "0", a counter, described later, is set to "0", and a flag F2, which stores the indication that a rewrite operation has been completed for the integrator, is set to "0", (step a7).

Then, the processor stores the velocity feedback amounts (velocity FB1 and velocity FB2) fed back by the velocity detectors 17 and 27, as VFB1 and VFB2 (step a8), and subtracts the velocity feedback amounts VFB1 and VFB2 from the velocity commands VCMD1 and VCMD2, respectively, obtained by the position control in step a1, to determine velocity deviations VER1 and VER2 (step a9).

$$VER1=VCMD1-VFB1 \quad (3)$$

$$VER2=VCMD2-VFB2 \quad (4)$$

The processor adds the velocity deviations VER1 and VER2 obtained in step a9 to a register that integrates the velocity deviations to store integral values IVER1 and IVER2, respectively. Thus, new integral values IVER1 and IVER2 are determined (step a10).

The processor determines whether or not a flag F1 storing the indication of the operation stop state is set to "1" (step a11). Since this flag is initialized to "0", the process shifts to a step a14 to add the product of the velocity deviations VER1 and VER2, determined in step a9, and the proportion constant (proportion gain) Kp to the product of the integral values IVER1 and IVER2m, determined in step a10, and the integration constant (integration gain) Ki to determine current commands (torque commands) TCMD1 and TCMD2 (step a14). These current commands are delivered to a current loop process to complete the process for this position and velocity control period.

$$TCMD1=Kp \times VER1+Ki \times IVER1 \quad (5)$$

$$TCMD2=Kp \times VER2+Ki \times IVER2 \quad (6)$$

Subsequently, provided that movement commands are outputted and are not "0", process steps a1, a2, a7 to a11, and a14 are executed for each position and velocity control period.

On the other hand, when the movement commands are "0", the process shifts from step a2 to step a3 to determine whether a flag F2 is "1", which stores the indication that a rewrite operation has been completed for the integrator, or not. If it is not "1", the process shifts to step a4. Then, it is determined whether or not a counter value is smaller than a parametrically set value N. If the counter value is smaller than the value N, "1" is added to the counter (step a5). Then, the processing in step a8 and the following steps are executed.

Until the counter value exceeds the set value N while the movement commands remain at a value of "0", the processing in steps a1 to a5, a8 to a11, and a14 is executed. Then, if the movement commands have a value different from "0" before the counter reaches the set value N, the processing in steps a1, a2, a7 to a11, and a14 is executed. Further, the processing in step a7 is executed to clear the counter to "0".

On the other hand, if the movement commands remain at a value of "0" and when the counter value exceeds the set value N, the process shifts from step a4 to step a6 to set the flag F1, indicating that the operation is stopped, to "1". Then, the processing in step a8 and the following steps are executed. In this case, since the flag F1 is set to "1", the process shifts from step a11 to step a12 to rewrite the integral value IVER2 of the velocity control integration element of the control system for the second motor 25, to the integral value IVER1 of the velocity control integration element of the control system for the first motor 15. Then, the flag F1 is set to "0", while the flag F2 is set to "1" (step a13).

Then, at step a14, the integral values of the integration elements of the control systems become the same (IVER1=IVER2). Then, on the basis of the same integral value, Equations (5) and (6), described above, are calculated to determine current commands (torque commands) TCMD1 and TCMD2, which are then outputted to a current loop process.

In the next and subsequent periods, even if the movement commands have a value of "0", since the flag F2 is set to "1", the process shifts from step a3 to step a8, with the flag F1 remaining at a value of "0". The process then proceeds from step a11 to step a14, and the integrator is not subjected to a rewrite operation.

That is, in this example, when the state where the movement command is "0" continues for a set time (set value N) so that it is determined that the operation has been stopped, one of the integral values is rewritten only once so that those integral values are the same.

In this regard, after detection of the operation stop state, the integral value may be rewritten for each position and velocity control period. In this case, for example, the processing in step a3 is not executed, and when the position commands have a value of "0" at step a2, the process shifts to step a4. The processing in step a13 is omitted, and the flag F1 may be set to "0" at step a7, instead of the flag F2. Thus, the movement commands remain at a value of "0", and as a result, the counter value exceeds the set value N so that the flag F1 is set to "1". Then, the position commands have a value different from "0", and until the flag F1 is set to "0" at step a7, the processing in step a12 is executed for each position and velocity control period to rewrite one of the integral values so that those integral values are always the same.

In this example, the operation stop state is determined if the movement commands remain at a value of "0" for the set time (set value N). However, the same determination may be made when the position deviation becomes equal to or smaller than the threshold level. In this case, when it is determined at step a4 that the counter value has exceeded the set value N, it may be determined whether or not the position deviation is equal to or smaller than the threshold level. The processing in step a6 may be executed only if the position deviation is equal to or smaller than the threshold level.

In the above example, the integral value is automatically rewritten when the operation is stopped. However, the rewrite operation may be performed in response to an external rewrite command. In this case, processing in steps a2 to a7 and a13 are not required, and the process may shift from step a1 to a8 to determine at step a11 whether or not there is any external signal, rather than determining whether or not the flag F1 is "1". If there is an external signal, the processing in step a12 may be executed to rewrite the integral value. The process may then proceed to step a14.

Further, in the above example, the processor of the digital servo circuit 102 performs the operation shown in the operational block diagram of FIG. 2. However, in this example, when the counter value exceeds the set value N and the integral value of the integrator is to be rewritten, if there is a large difference between the integral value prior to a rewrite operation and the integral value after the rewrite operation, then the current command (torque command) TCMD2 changes suddenly.

Figure 9:
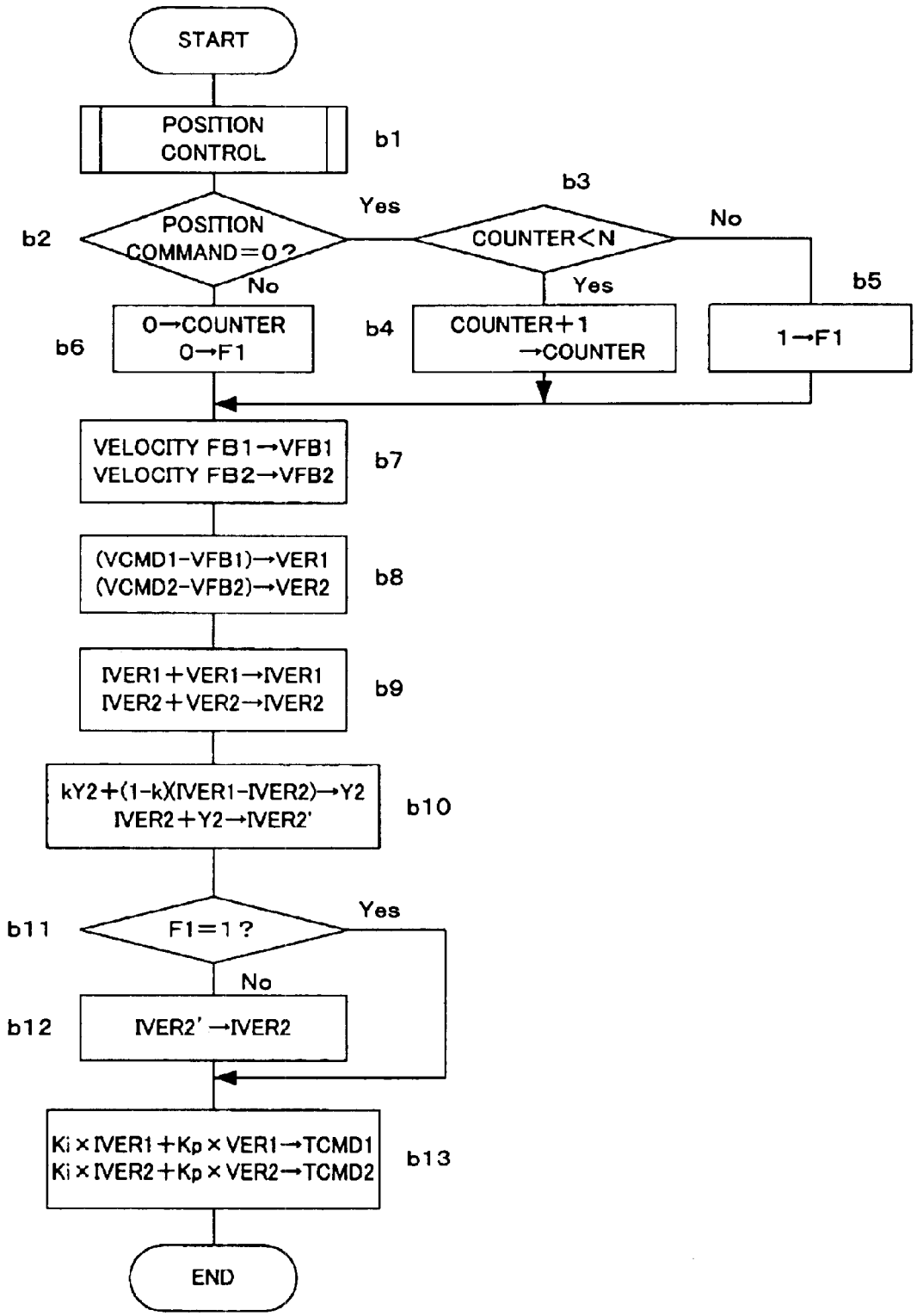
FIG. 9 is a flow chart of a process executed for each position and velocity control period by a processor of a digital servo circuit in the motor control system of FIG. 7 when the velocity integrator sharing means according to the second example is used.

Description will be given of an example of operation process in which a rewrite operation is gradually performed on the basis of a primary delay as shown in the operational block diagram of FIG. 3 to avoid such sudden change in current command. FIG. 9 is a flow chart of a position and velocity control process executed when the processor of the digital servo circuit 102 carries out this example.

Compared to the flow chart shown in FIG. 8, the processing in step a3 in FIG. 8 is omitted and the processing in steps b1 to b5 are the same as the processing in steps a1, a2, and a4 to a6 in FIG. 8. Further, the processing in step b6 is the same as the processing in step a7 except that instead of the flag F2, the flag F1 is set to "0". That is, with the process shown in FIG. 9, if the position commands remain at a value of "0" even after the counter value exceeds the set value N, the flag F1 is set to "1". Then, the flag F1 remains at a value of "1" until position commands with a value different from "0" are provided.

Further, the processing in steps b7 to b9 are the same as the processing in steps a8 to a10. Furthermore, this example is characterized in that the processing in steps b10 to b12 are executed in order to equalize the integral values on the basis of a primary delay transfer function.

First, a differential equation for a transfer function $1/(1+\tau S)$ for a primary delay element is determined to obtain the following Equation (7) where $U_i$ denotes an input to the primary delay element during an i-th period, and $Y_i$ denotes an output from this element during the same period.

$$Y_i = k \times Y_{i-1} + (1-k)U_i \qquad (7)$$

Reference character k denotes a constant determined by a time constant $\tau$ for the primary delay element and a sampling period (in this case, a position and velocity control period).

In this example, the input $U_i$ to the primary delay element is a difference (IVER1−IVER2) between the integral value IVER1 of the integration element in the first motor control system and the integral value IVER2 of the integration element in the second motor control system. This difference is added to the integral value IVER2 from the integration element of the second motor control system on the basis of the primary delay to obtain a new integral value IVER2'.

$$Y_i = k \times Y_{i-1} + (1-k)U_i \qquad (8)$$
$$= k \times Y_{i-1} + (1-k)(IVER1_i - IVER2_i)$$

$$IVER2' = IVER2 + Y_i \qquad (9)$$

If the integral value IVER1 in the first motor control system is large, whereas the integral value IVER2 in the second motor control system is small, then the output $Y_i$ from the primary delay element is positive. Then, this positive value is added to the integral value IVER2 in the second motor control system, so that the integral value IVER2 becomes closer to the integral value IVER1 in the first motor control system on the basis of the primary delay. This also applies to the case in which the two integral values have the inverse signs. For example, if the integral value IVER1 is positive, whereas the integral value IVER2 is negative, then the output Yi from the primary delay element is positive. This positive value is added to the integral value IVER2 to make it closer to the integral value IVER1.

The processing for Equations (8) and (9), described above, is executed at step b10. That is, the value obtained by multiplying an output Y2 from the primary delay element during the preceding period by the constant k is added to the value obtained by subtracting the integral value IVER2 in the second motor control system from the integral value IVER1 in the first motor control system determined at step b9 and multiplying the difference by (1−k), to determine an output Y2 from the primary delay element during the current period. The determined output Y2 is then stored. Furthermore, the output Y2 is added to the integral value IVER2 in the second motor control system to determine a new integral value IVER2' in the second motor control system.

Then, it is determined whether or not the flag F is "1", i.e. whether or not the operation is stopped (step b11). If the flag F is not "1", then the process shifts to step b13. If the flag F is "1", the new integral value IVER2', determined at step b10, is used as the integral value IVER2 in the second motor control system (step b12). The process then shifts to step b13. At step b13, the current commands (torque commands) TCMD1 and TCMD2 are determined on the basis of the velocity deviations VER1 and VER2, determined at step b8, and the integral values IVER1 and IVER2, determined at steps b9 and b12.

That is, if the flag F1 is not set to "1" and the operation is not stopped, then position and velocity control for each motor is carried out on the basis of the position commands MCMD1 and MCMD2, provided by the higher controller 100, the position feedback amounts (position FB1 and position FB2), and the velocity feedback amounts (velocity FB1=VFB1 and velocity FB2=VFB2), as in the case with the conventional example. Then, a velocity loop control process is executed on the basis of the determined velocity deviations VER1 and VER2 and the integral values IVER1 and IVER2 (steps b8 and b9) to determine current commands TCMD1 and TCMD2 (step b13).

On the other hand, if the operation is stopped to set the flag F1 to "1", then at step b10, the integral value IVER2 in the second motor control system is corrected to be equal to the integral value IVER1 in the first motor control system on the basis of the primary delay. Then, at step b12, the integral value IVER2 is rewritten and this rewritten value is then used to determine current commands. Thus, the integral value in the second motor control system follows the integral value in the first motor control system on the basis of the primary delay and gradually becomes equal to the latter.

Also in this example, the operation stop state is detected to automatically rewrite the integral value. However, the rewrite operation may be performed in response to an external signal. In this case, the processing in steps b2 to b6 are not required, and at step b11, it is determined whether or not there is any external signal for a rewrite command.

Figure 10:
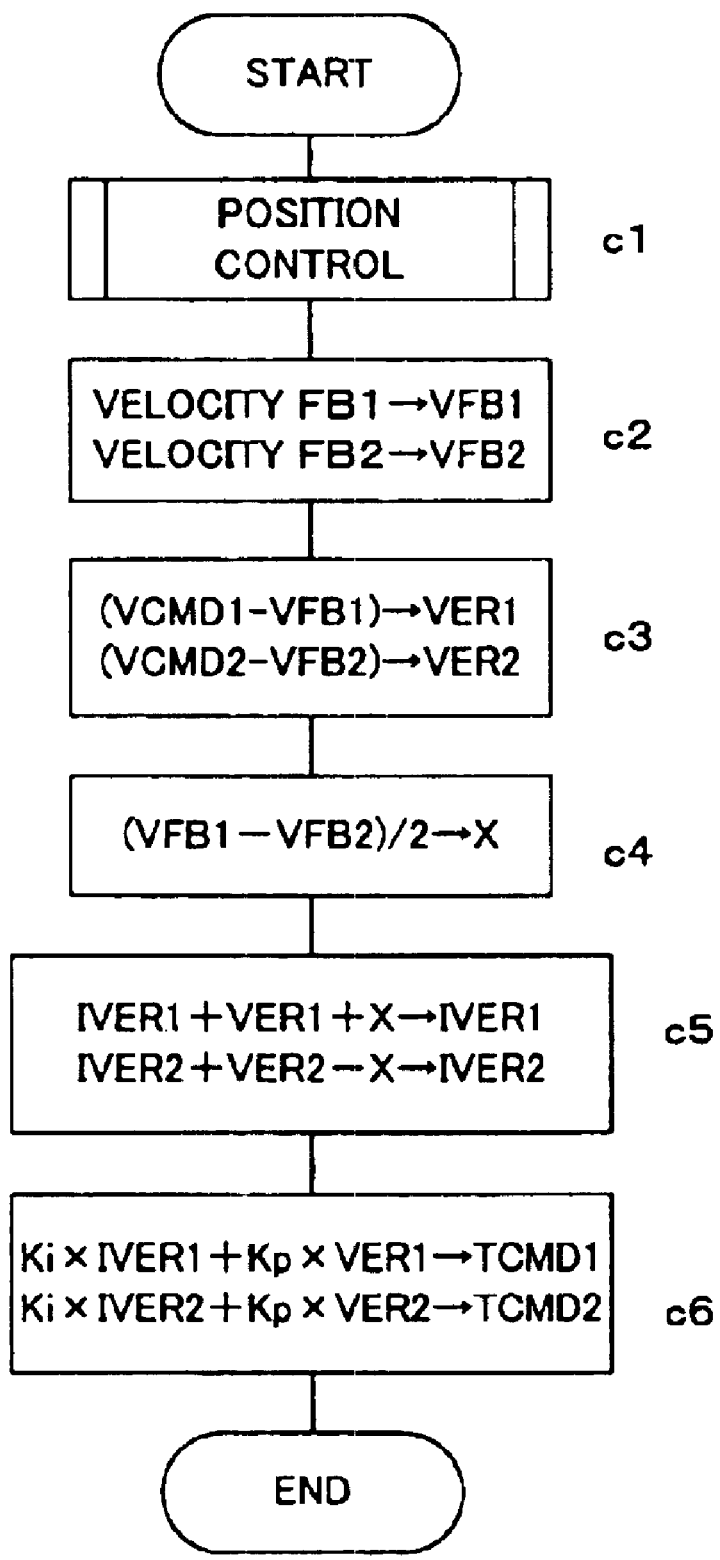
FIG. 10 is a flow chart of a process executed for each position and velocity control period by a processor of a digital servo circuit in the motor control system of FIG. 7 when the velocity integrator sharing means according to the third example is used.

FIG. 10 is a flow chart of the operation shown in FIG. 4 and performed by the processor of the digital servo circuit 102.

Position control is carried out to determine velocity commands VCMD1 and VCMD2 (step c1), and the velocity feedback amounts VFB1 and VFB2 are read from the first and the second velocity detectors 17 and 27, respectively, (step c2) to determine velocity deviations VER1 and VER2, respectively (step c3). This process is the same as steps a1, a8, and a9, shown in FIG. 8.

In this example, the velocity feedback amount VFB2 for the second motor is subtracted from the velocity feedback amount VFB1 for the first motor 15, and the difference is then divided by two to determine an amount X(=(VFB1−VFB2)/2) equal to half of a difference between the velocity feedback amounts (step c4). The velocity deviations VER1 and VER2, determined at step c3, are added to the integral values IVER1 and IVER2 obtained during the preceding period, respectively. Further, the amount X is added to the sum of the integral value IVER1 and the velocity deviation VER1, whereas the amount X is subtracted from the sum of the integral value IVER2 and the velocity deviation VER2, to determine new integral values IVER1 and IVER2, respectively (step c5). That is, as described previously (see Equations (1) and (2)), the velocity deviation, obtained by subtracting the average value of the velocity feedback amounts from each velocity command, is added to the corresponding integral value for integration.

On the basis of the thus determined integral values IVER1 and IVER2 and the velocity deviations VER1 and VER2, determined at step c3, the respective current commands TCMD1 and TCMD2 are obtained and delivered to the current loop process (step c6), thus completing the process for this period. The integral values of the integration elements are equalized by executing the processing in steps c1 to c6, described above, for each period.

Figure 11:
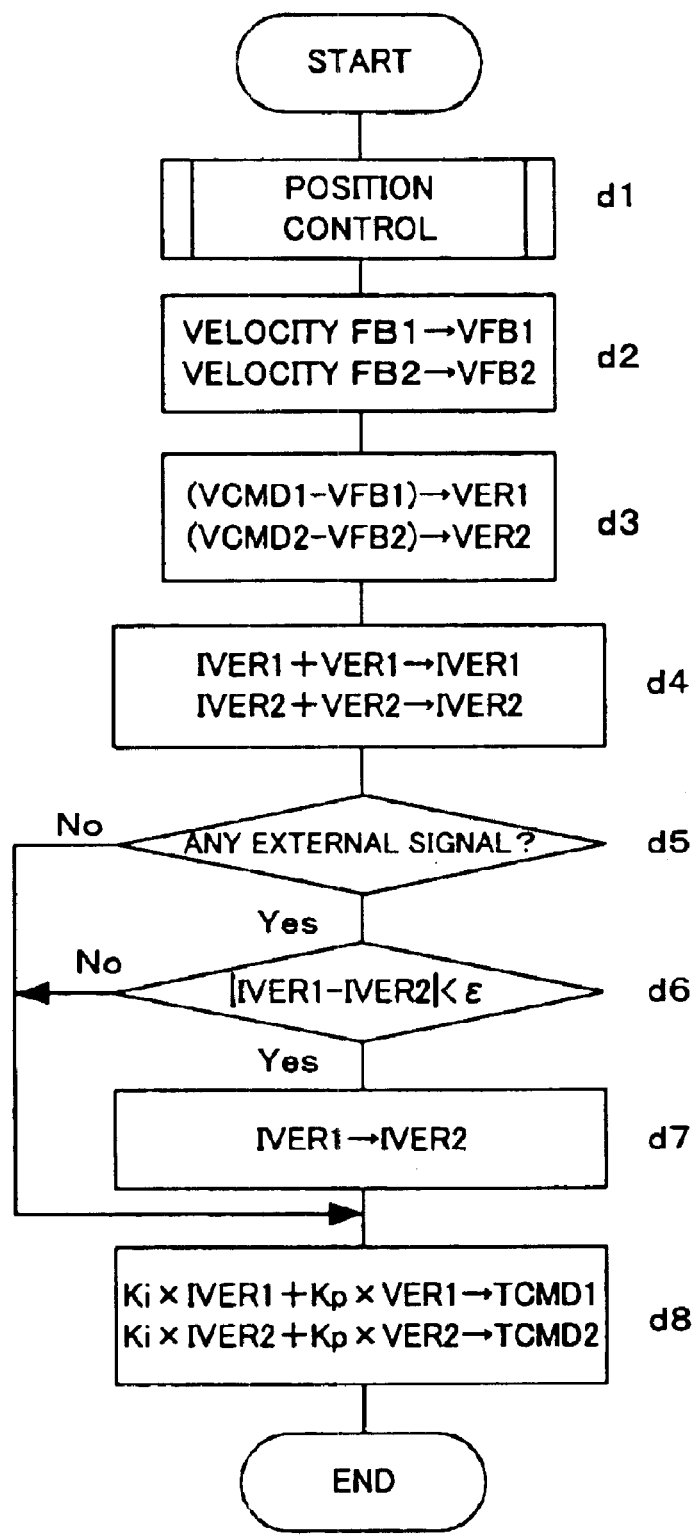
FIG. 11 is a flow chart of a process executed for each position and velocity control period by a processor of a digital servo circuit in the motor control system of FIG. 7 when the velocity integrator sharing means according to the fourth example is used.

FIG. 11 is a flow chart of the operation shown in FIG. 5 and executed by the processor of the digital servo circuit 102.

Position control is carried out to determine velocity commands VCMD1 and VCMD2 (step d1), and the velocity feedback amounts VFB1 and VFB2 are read from the first and the second velocity detectors 17 and 27, respectively, (step d2) to determine velocity deviations VER1 and VER2, respectively (step d3). This process is the same as the processing in steps c1 to c3, shown in FIG. 10. Furthermore, the velocity deviations VER1 and VER2 are integrated to determine integral values IVER1 and IVER2 (step d4). This process is similar to the conventional position and velocity control process.

In this example, it is determined whether or not there is any external signal (step d5). If there is no external signals or if the difference between the integral values of the velocity control sections in the motor control systems is not within a set predetermined range $\epsilon$ even if any external signal has been input (step d6), then on the basis of the velocity deviations VER1 and VER2, determined at step d3 as in the case with the conventional example, and the integral values IVER1 and IVER2, determined at step d4, the respective current commands (torque commands) TCMD1 and TCMD2 are determined and delivered to the current control process, thus completing the process for this period (step d8).

On the other hand, if the operator inputs a command for equalizing the integral values, as an external signal, this command is stored and detected at step d5. Then, since the integral values of the integrators in the velocity control sections vary, the process waits until the difference between the integral values lies within the set predetermined range $\epsilon$ (step d6). Once the difference lies within the predetermined range $\epsilon$, the integral value IVER2 in the second motor control system is switched to the integral value IVER1 in the first motor control system, so that these values are the same (step d7). Further, the stored input external signal is cleared. Then, this integral value (IVER2=IVER1) is used to determine current commands TCMD1 and TCMD2 at step d8.

In the above example, step d6 is provided to prevent the integral value of being rewritten unless the difference in the integral values of the motor control systems comes within the set range $\epsilon$, even if any external signal is inputted. This is to avoid a sudden change in current command which may occur if a rewrite operation is performed when there is a large difference between the integral values. The integral values normally vary as described later and the difference in the integral values may thus decrease. Alternatively, step d6 may be omitted so that the presence of an external signal causes the integral value to be rewritten without delay(step d7).

Figure 12A:
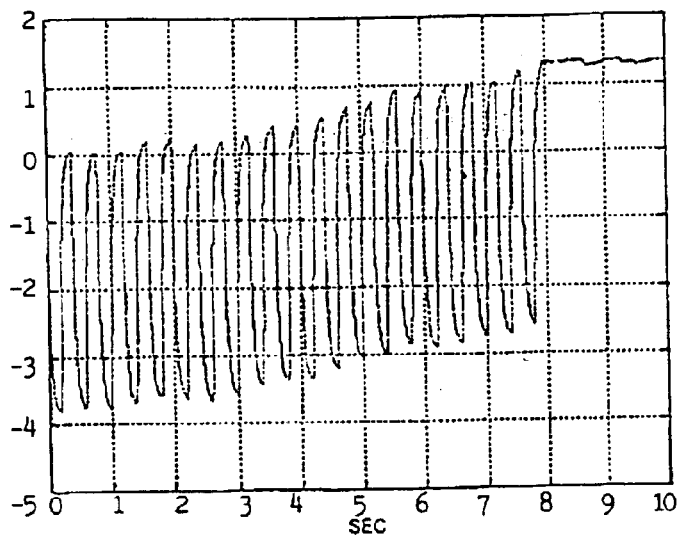
FIGS. 12A to 12C are charts showing the results of experiments.
Figure 12B:
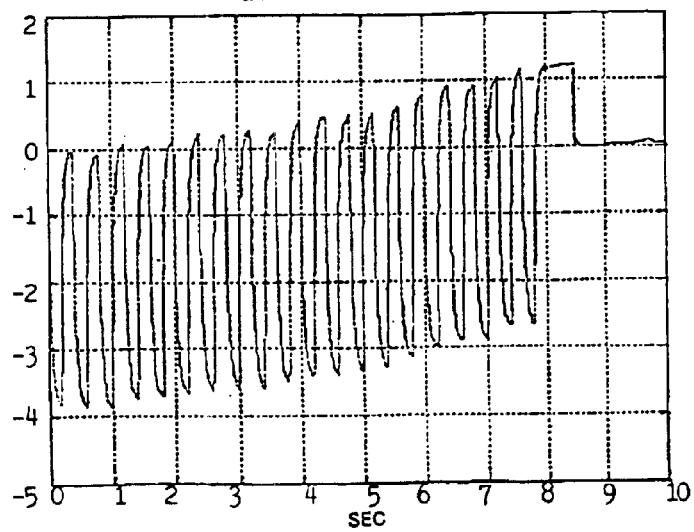
Figure 12C:
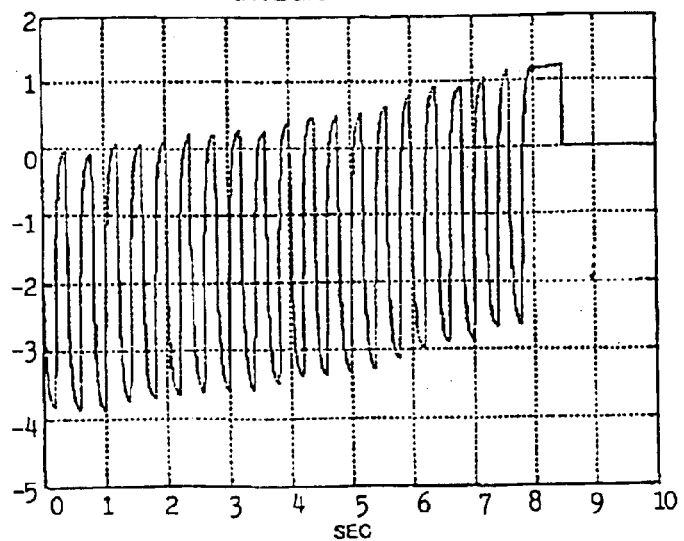

FIGS. 12A to 12C show the results of experiments conducted to check the effects of the present invention. In the example shown in these drawings, triangular-wave-like position commands were inputted for eight seconds, and then the inputting of the commands was stopped for two seconds. Then, a difference in integral value was detected between the velocity control sections of the first and second motor control systems. In the charts, the axis of abscissas indicates time, while the axis of ordinates indicates a difference in integral value. FIG. 12A shows the results of experiments in which no processes such as rewriting of the integral value were executed. This drawing indicates that a difference in integral value remains after the operation is stopped. FIG. 12B shows the results of experiments in which a rewrite operation was performed for the integrator 8.5 seconds later. This drawing indicates that the difference in integral value is substantially "0". FIG. 12C shows the results of experiments in which the rewrite operation was subsequently continuously performed 8.5 seconds later. This drawing indicates that the difference in integral value is completely eliminated.

What is claimed is:

1. A servo controller that allows one driven body to be driven by a plurality of motors, comprising, for each of the motors:

a position control section which calculates a position deviation value as a difference between a position command value inputted by a higher controller and a feedback value provided by a position detector that detects a position of said driven body, and then outputs a velocity command;

a velocity control section which receives the velocity command value and obtains, using an integration element and a proportion element, a current command based on the velocity command value and a velocity feedback value provided by a velocity detector that detects a velocity of said driven body, and then outputs the obtained current command;

wherein each of said position control sections receives the same position command from said higher controller to control the driven body, and said servo controller further comprises means for equalizing outputs from said integration elements in said velocity control sections.

2. The servo controller according to claim 1, wherein said means for equalizing the outputs from the integration elements uses an output from the integration element of one of said plurality of velocity control sections as an output from the integration element of the other velocity control section.

3. The servo controller according to claim 1, wherein said means for equalizing the outputs from the integration elements replace an integral value of the integration element in one of said plurality of velocity control sections with an integral value of the integration element in the other velocity control section by rewriting.

4. The servo controller according to claim 1, wherein said means for equalizing the outputs from the integration elements determines an average value for said velocity feedback amounts inputted by said plurality of velocity control sections and uses this average value as a velocity feedback amount for the integration element in each of said plurality of velocity control sections.

5. The servo controller according to claim 3, wherein said means for equalizing the outputs from the integration elements obtains the same value by using a time constant circuit to cause a delay for a fixed time.

6. The servo controller according to claim 1, wherein said means for equalizing the outputs from the integration elements is enabled while said driven body is stopped.

7. The servo controller according to claim 3, wherein said means for equalizing the outputs from the integration elements performs one rewrite operation whenever said driven body is stopped.

8. The servo controller according to claim 3, wherein said means for equalizing the outputs from the integration elements performs a rewrite operation whenever and while said driven body is stopped.

9. The servo controller according to claim 1, wherein said means for equalizing the outputs from the integration elements is enabled when an external signal is inputted.

10. The servo controller according to claim 2, wherein said means for equalizing the outputs from the integration elements is enabled when the integration elements provide the same value after the external signal has been inputted.

11. A servo controller that allows one driven body to be driven by a plurality of motors, comprising:
   position control sections that carry out position loop control for each of the motors; and
   velocity control sections that carry out velocity loop control including a proportion and integration processes,
   wherein each of the position control sections receives the same position command from a higher controller, and carries out position loop control to output a velocity command, and
   an integration element is provided in only the velocity control section for a particular one of said plurality of motors, and each of the velocity control sections for other motors carries out an integration process using an output from the integration element of the velocity control section for said particular motor, and carries out a proportion process on the basis of its own velocity feedback value.

12. A servo controller that allows one driven body to be driven by a plurality of motors, comprising, for each of the motors:
   a position control section to calculate a position deviation value as a difference between a position command value inputted by a higher controller and a feedback value provided by a position detector that detects a position of said driven body, and then output a velocity command;
   a velocity control section to receive the velocity command value and generate, using an integration element and a proportion element, a current command based on the velocity command value and a velocity feedback value provided by a velocity detector that detects a velocity of said driven body, and then output the generated current command;
   wherein each of said position control sections receives the same position command from said higher controller to control the driven body, and
   said servo controller further comprises a unit to equalize outputs from said integration elements in said velocity control sections.

13. A servo controller that allows one driven body to be driven by a plurality of motors, comprising:
   a velocity control section for each of the motors to generate a velocity control signal, using an integration element and a proportion element, based on a received velocity command value and a velocity feedback value, and
   an equalizing unit to equalize outputs from the integration elements in the velocity control sections.

* * * * *